(12) United States Patent
Duggal

(10) Patent No.: US 11,890,821 B1
(45) Date of Patent: Feb. 6, 2024

(54) DEDICATED SEAM TAPE AND DEDICATED ACCESSORY FABRIC FOR INFLATABLE DEVICES

(71) Applicant: Air Cruisers Company, LLC, Wall Township, NJ (US)

(72) Inventor: Deepak Duggal, Avenel, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 255 days.

(21) Appl. No.: 16/528,074

(22) Filed: Jul. 31, 2019

Related U.S. Application Data

(60) Provisional application No. 62/713,237, filed on Aug. 1, 2018.

(51) Int. Cl.
*B29C 65/00* (2006.01)
*B29C 65/50* (2006.01)
(Continued)

(52) U.S. Cl.
CPC ........ *B29C 66/439* (2013.01); *B29C 65/4855* (2013.01); *B29C 65/5028* (2013.01);
(Continued)

(58) Field of Classification Search
CPC .............. B29C 66/439; B29C 65/5042; B29C 65/5028; B29C 66/7292; B29C 65/4855; B29C 66/1142; B29C 66/71; B29C 66/5221; B29C 65/18; B29C 66/73921; B29C 66/24221; B29C 66/54; B29C 66/133; B29C 22/02; B29C 66/729; B29C 66/0384; B29C 65/08; B29C 65/10; B29C 2031/485; B29C 65/04; C09J 7/35; Y10T 428/28; B64D 25/14; B64D 25/18; B29L 2031/3067; B29L 2031/5254;
(Continued)

(56) References Cited

U.S. PATENT DOCUMENTS 2,323,629 A * 7/1943 Spanelabrahamn ...... B63C 9/08
493/189
2,713,746 A * 7/1955 Haugh ................ B29C 66/1122
446/222
(Continued)

*Primary Examiner* — Patricia L. Nordmeyer
(74) *Attorney, Agent, or Firm* — Kilpatrick Townsend & Stockton LLP

(57) ABSTRACT

Air- or gas-holding fabrics and improvements to welded seam tapes used to join multiple fabric panels and/or to join accessories to one or more fabric panels. Specifically disclosed is a joining system and method for securing air- or gas-holding panels to one another and/or to joining accessories to one or more panels without causing damage due to overheating the seam area. This disclosure has been found particularly useful with improved lightweight fabrics that would otherwise be more susceptible to damage during welding processes. The disclosed seam tapes and accessory fabrics find particular use in connection with inflatable devices, but may be used in other applications. This disclosure relates to a dedicated seam tape or dedicated accessory fabric that (a) utilizes specialized coatings with a lower melt temperature compared to coatings that are used on inflatable fabric material and/or (b) is manufactured from material that has not been treated to have substantial reflective properties.

19 Claims, 4 Drawing Sheets

(51) Int. Cl.
*B29C 65/48* (2006.01)
*C09J 7/35* (2018.01)

(52) U.S. Cl.
CPC ...... *B29C 65/5042* (2013.01); *B29C 66/7292* (2013.01); *C09J 7/35* (2018.01); *B29C 66/1142* (2013.01); *B29C 66/71* (2013.01); *Y10T 428/28* (2015.01)

(58) Field of Classification Search
CPC ......... B29L 2031/3076; B29L 2022/02; B63C 9/1255; B63C 9/04; B29K 2995/0067
See application file for complete search history.

(56) References Cited

U.S. PATENT DOCUMENTS

| | | | |
|---|---|---|---|
| 4,846,917 A * | 7/1989 | Hartel | B29C 66/433 |
| | | | 156/286 |
| 8,153,224 B2 * | 4/2012 | Pellegrini | C09J 5/04 |
| | | | 428/61 |
| 8,651,514 B2 | 2/2014 | Zhang | |
| 8,741,412 B2 | 6/2014 | Wangbunyen et al. | |
| 9,012,003 B2 | 4/2015 | Harward | |
| 9,247,794 B2 | 2/2016 | Cross et al. | |
| 10,131,092 B1 * | 11/2018 | Cook | A63G 31/12 |
| 10,195,791 B1 * | 2/2019 | Reeves, Jr | B64D 25/14 |
| 2006/0165939 A1 * | 7/2006 | Hottner | B29C 66/1122 |
| | | | 428/57 |
| 2017/0266875 A1 * | 9/2017 | Brensinger | B29C 65/08 |

\* cited by examiner

DEDICATED SEAM TAPE AND DEDICATED ACCESSORY FABRIC FOR INFLATABLE DEVICES

CROSS REFERENCE TO RELATED APPLICATIONS

This application is related to and claims priority benefits from U.S. Provisional Application Ser. No. 62/713,237, filed on Aug. 1, 2018, entitled "Dedicated Seam Tape and Dedicated Accessory Fabric," the entire contents of which are hereby incorporated by this reference.

FIELD OF THE INVENTION

The field of this disclosure relates to air- or gas-holding fabrics and improvements to welded seam tapes used to join multiple fabric panels and/or to join accessories to one or more fabric panels. Specifically disclosed is a joining system and method for securing air- or gas-holding panels to one another and/or to joining accessories to one or more panels without causing damage due to overheating the seam area. This disclosure has been found particularly useful with improved lightweight fabrics that would otherwise be more susceptible to damage during welding processes. The disclosed seam tapes and accessory fabrics find particular use in connection with inflatable devices, but may be used in other applications. This disclosure relates to a dedicated seam tape or dedicated accessory fabric that (a) utilizes specialized coatings with a lower melt temperature compared to coatings that are used on inflatable fabric material and/or (b) is manufactured from material that has not been treated to have substantial reflective properties.

BACKGROUND

Federal aviation safety regulations require aircraft to provide evacuation and other safety provisions for passengers. These include evacuation slides, evacuation slide/rafts, life rafts, life vests, and other life-saving inflatable devices. Relevant inflatable products that can be improved using the present disclosure can include evacuation slides, evacuation slides/rafts, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety devices requiring rapid inflation and secure air- or gas-holding functions. These inflatable devices are generally built from an assembly of inflatable tubular structures that form airbeams that are sealed to one another. Inflatable products of the type described may also have non air- or gas-holding features, such as patches, floors, sliding surfaces, girts, handles, and other features.

Inflatable products are typically made of many pieces of fabric (referred to as panels or body tube fabric material) joined together to form tubular structures. Safety regulations set strength requirements for the body tube fabric material (the field of the inflatable tube), as well as strength requirements for seam areas. In order to keep the inflation gas inside the tubes for long durations, the seams must be sealed together (via welding or adhesive bonding methods) to make them air- or gas-holding.

Possible welding methods include but are not limited to: thermal welding, heat or hot air welding, heated wedge welding, heated roller (or rotary wheel) welding, hot stamped welding, radiofrequency (RF) welding, ultrasonic welding, combinations thereof, or any other appropriate welding method. All of these options are generally referred to herein as "welding." The term "welding" is used herein to refer to any methods or steps that cause two separate materials to flow into one another.

Typically, in welding two air- or gas-holding panels to one another, a butt seam is used. The butt seam is then sealed with a reinforcing tape on the outside surface and with an air- or gas-holding film on the inside surface. As illustrated by FIGS. 1-2, seam intersections 10 are sealed via a butt seam between two panels 12. Seam tape 14 is positioned at the seam intersection 10. FIG. 2 also illustrates use of an air-holding film 16 on an opposite surface. FIG. 3 illustrates a seam tape crossover, where a first seam tape 14a is used to secure panels to one another in one direction (e.g., a longitudinal direction), and a second seam tape 14b is used to secure additional panels to one another in another direction (e.g., in a transverse direction). FIG. 4 illustrates that air- or gas-holding films 16a and 16b may be similarly used on an opposite side of the panels. FIGS. 5 and 6 illustrate overlap seams. For an overlap seam, panels 12 are allowed to overlap one another as illustrated by FIG. 5, and seam tape 14 is applied. Overlap seams may or may not include air- or gas-holding film 16 on the inside surface. FIG. 6 illustrates air- or gas-holding film 16 being used with an overlap seam.

In order to manufacture these configurations, the panels 12 and the seam tape 14 are typically cut from the same roll of fabric, which is generally coated on the top and bottom surfaces. The coating may be nylon, polyurethane, vinyl, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), polylactic acid (PLA), or any combination thereof, or any appropriate materials.

The seam intersections illustrated by FIGS. 1-6 are then generally created by melting the coating on the seam tape 14 and the fabric panel 12 by exposing both to heat via welding when positioned adjacent to one another (i.e., when the seam tape 14 is applied to the panel 12), welding the two sides together. Subsequent pressure is applied to the seam intersection 10, securing the tape 14 and panel 12 into a welded configuration.

The present disclosure seeks to improve seam tapes configured to be used at the described seam intersections.

SUMMARY

The present disclosure seeks to improve the welding process of applying seam tapes or accessories to inflatable fabrics. Historically, the same material has been used for both the fabric panel 12 and the seam tape 14 or accessory fabric, meaning that the coating melt temperature tolerances of both are exactly the same. This has resulted in a balancing act between seam adhesion strength, coating melt temperatures, and seam air- or gas-holding characteristics. The required high heat for welding these components with the same temperature tolerances can damage the underlying fabric panels and/or the coatings in the seam vicinity, thereby causing seam leaks.

Accordingly, there is provided a seam tape used to join one or more panels to create an inflatable product, the seam tape comprising a material having a coating melt temperature at least 10° C. lower than the one or more panels to which the seam tape is being welded. There is also provided a fabric used to make an accessory for an inflatable product and configured to be welded to one or more panels of the inflatable product, the accessory fabric comprising a material having a coating melt temperature at least 10° C. lower than the one or more panels to which the accessory fabric is being welded.

The seam tape may be used to join two panels of air- or gas-holding fabric together to create an inflatable product. The fabric may be welded to the accessory and/or the air- or gas-holding fabric.

The material of the seam tape or fabric disclosed may include but is not limited to polyamide (nylon), polyethylene terephthalate (PET), polyester, ultra high molecular weight polyethylene, polypropylene, cotton, carbon, glass meta-aramid material, para aramid material, liquid crystalline polymers, or any combination thereof.

The coating material of the seam tape or fabric disclosed may include but is not limited to polyurethane, vinyl, polyethylene, polypropylene, polyamides, polyethylene terephthalate (PET), polystyrene, ethylene vinyl acetate (EVOH), polyvinylidene chloride (PVDC), polyvinyl alcohol (PVOH), polycarbonate (PC), polyvinyl chloride (PVC), polylactic acid (PLA), a polymer, or any combination thereof.

The seam tape or fabric may be used in connection with the inflatable product that may include but is not limited to evacuation slides, evacuation slides/rafts, aviation life rafts, marine life rafts, emergency floats, emergency flotation systems, life preservers/vests, emergency flotation devices, inflatable shelters (military and nonmilitary), ship decoys and inflatable military targets, flotation devices, rescue equipment, or other safety devices requiring rapid inflation and secure air- or gas-holding functions.

The seam tape or fabric may have a high seam adhesion strength. The seam tape or fabric may be formed from a material that has not been treated to have substantial reflective properties. The coating melt temperature of the seam tape or fabric may be about 200-280° C.

DETAILED DESCRIPTION

Figure 1:
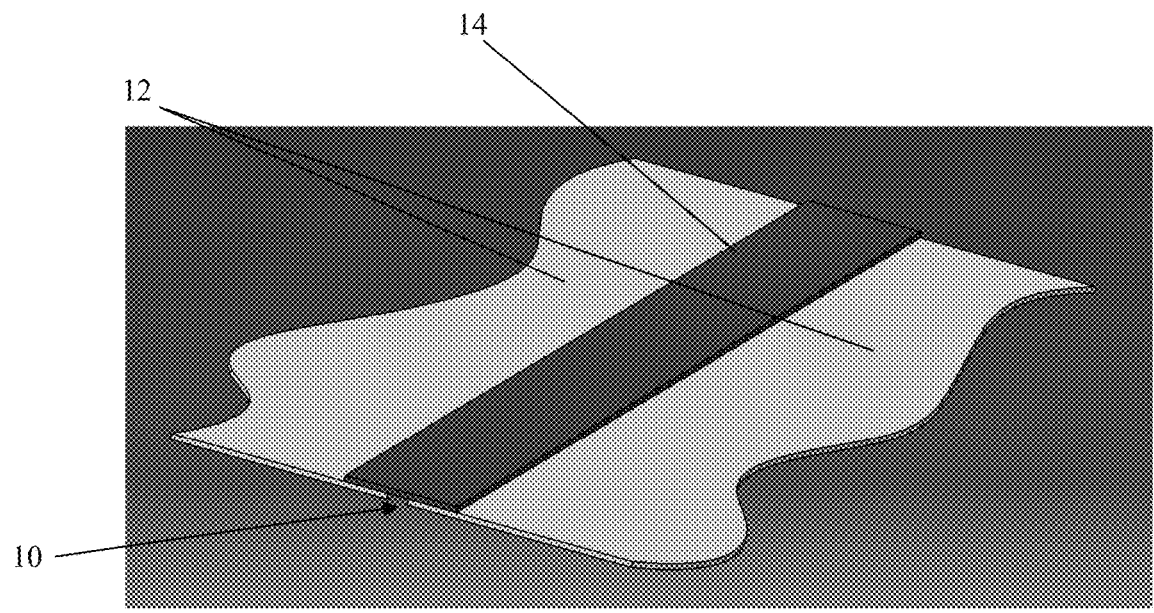
FIG. 1 shows a top perspective view of a seam tape securing two fabric panels to one another at a seam intersection.
Figure 2:
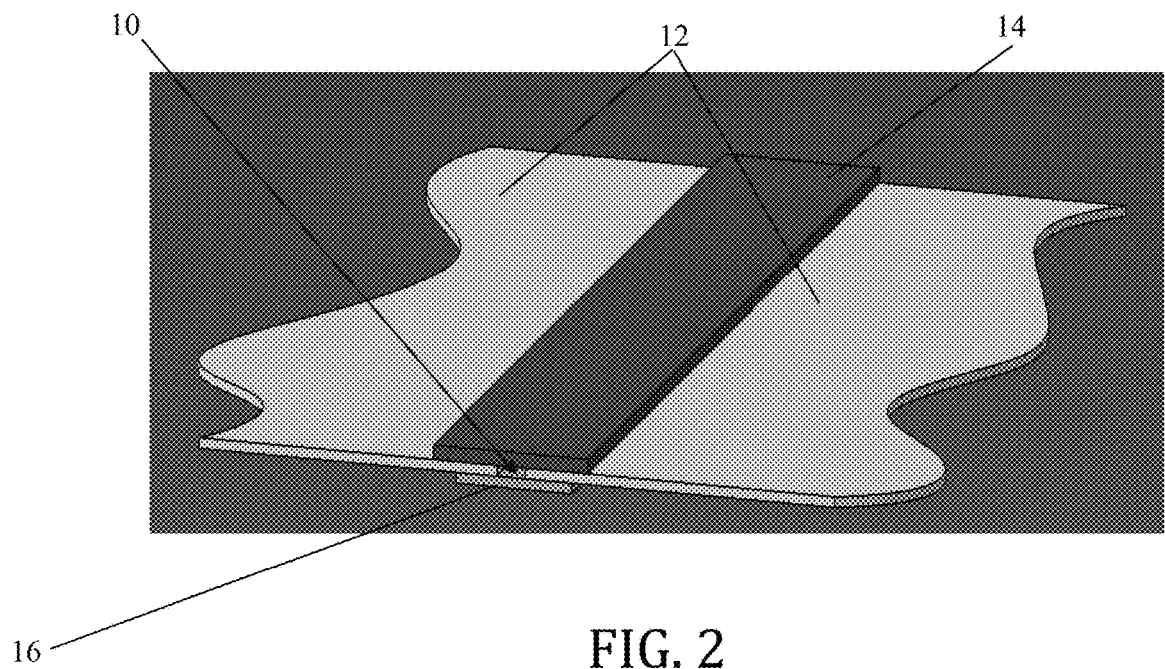
FIG. 2 shows a top perspective view of the configuration of FIG. 1, with an air- or gas-holding film positioned on the opposite side of the seam intersection.
Figure 3:
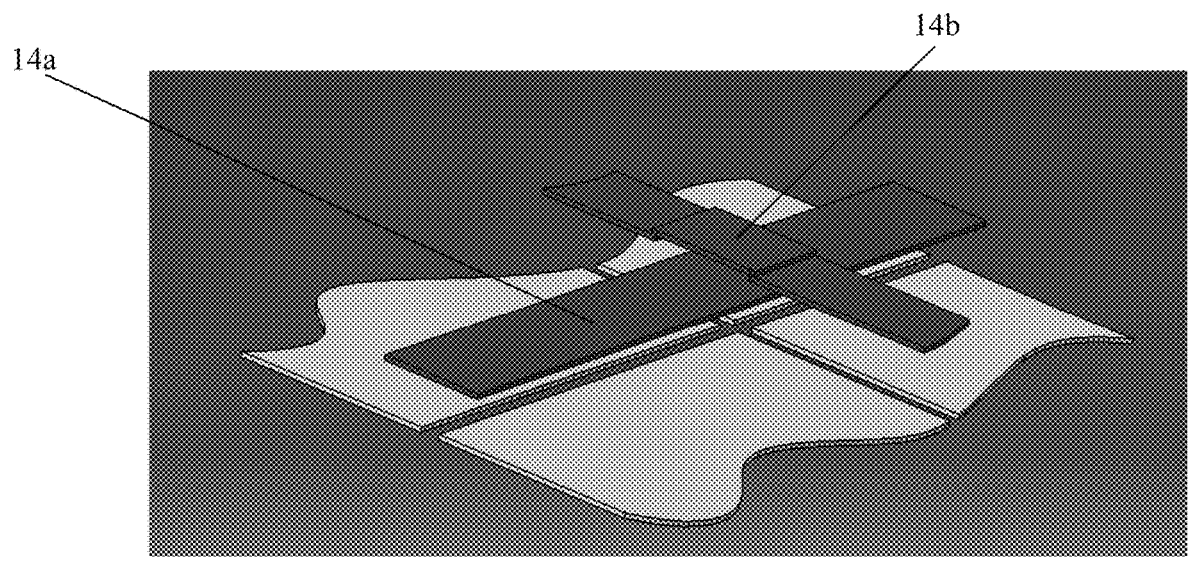
FIG. 3 shows a side perspective exploded view of a seam tape crossover.
Figure 4:
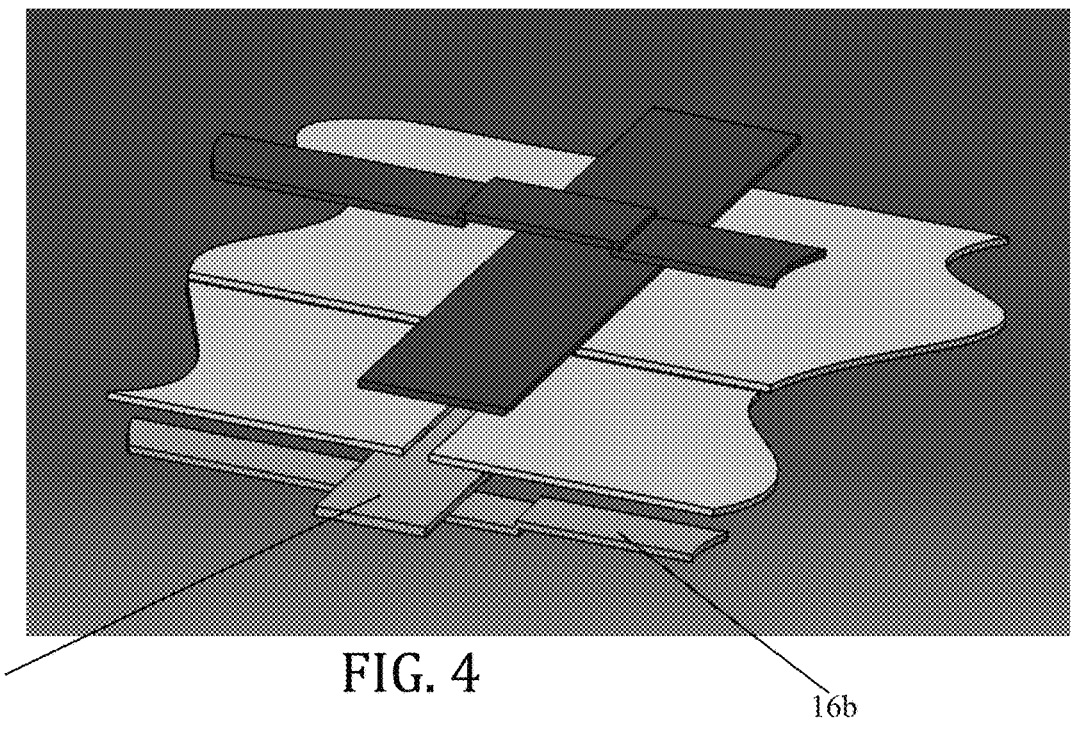
FIG. 4 illustrates a side perspective exploded view of the configuration of FIG. 3, with an air- or gas-holding film positioned on the opposite side of the seam intersection.
Figure 5:
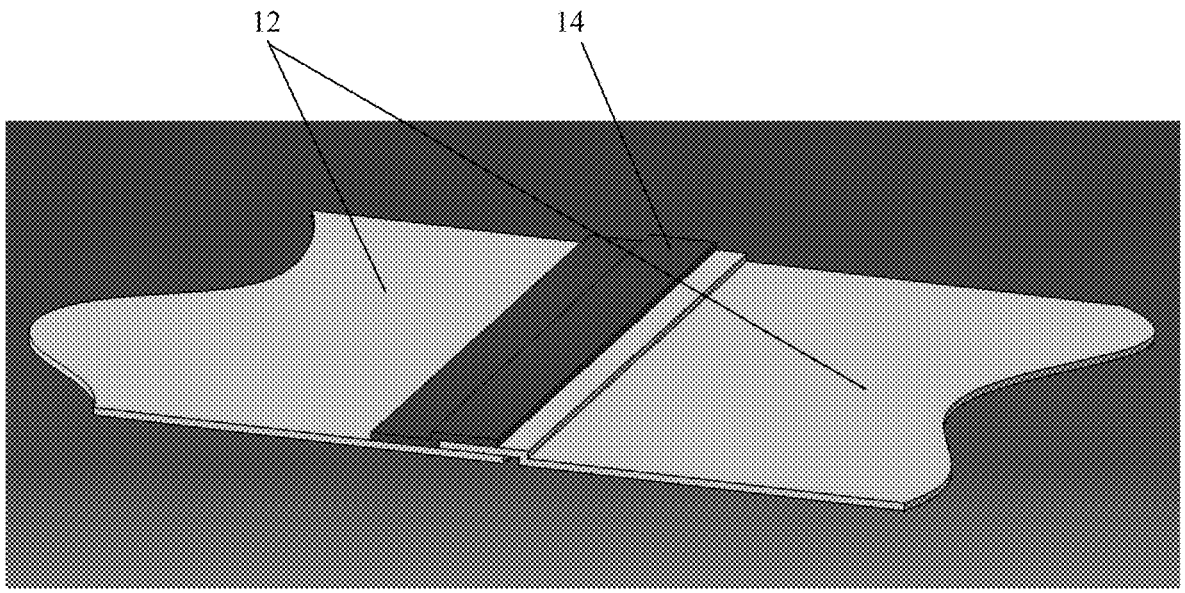
FIG. 5 shows a side perspective view of a seam crossover.
Figure 6:
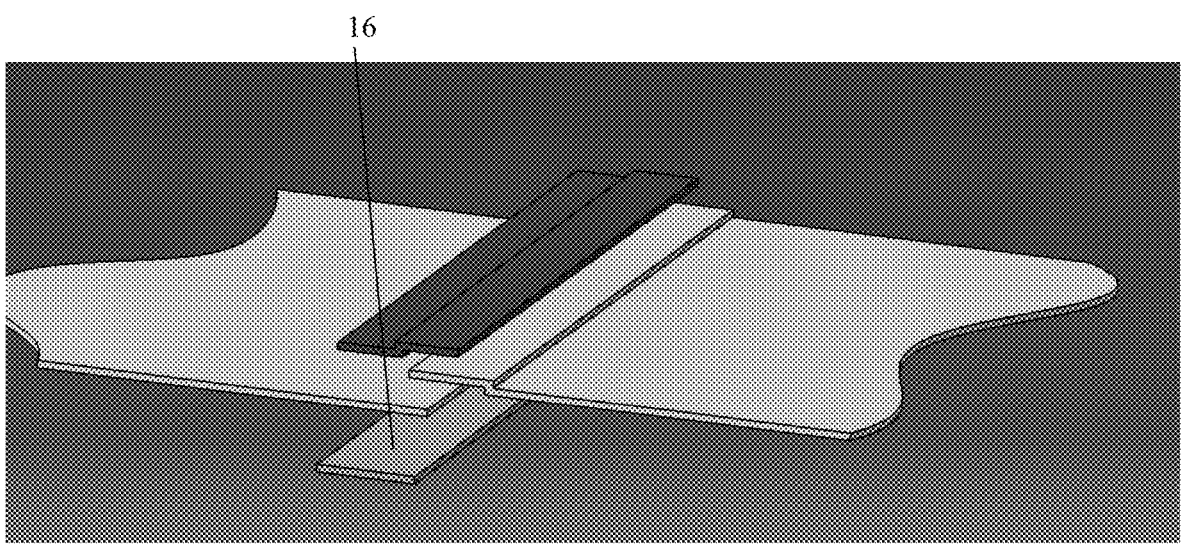
FIG. 6 illustrates a side perspective exploded view of the configuration of FIG. 5, with an air- or gas-holding film positioned on the opposite side of the seam intersection.

The present disclosure provides a solution that overcomes some of the deficiencies of the known art and the problems that remain unsolved. Specifically, fabric or seam weakening problems may be encountered due to the high heat required for seam welding, particularly with recent fabrics that have been designed to be more lightweight and thinner than traditional inflatable fabrics. Some of the challenges that exist with joining these body tube materials or panels into air- or gas-holding tubular structures can include: melting the coating (without damaging the gas barrier or the fibers), and needing to add more heat to achieve the required seam adhesion. Additionally, using very high heat welding temperatures have the potential to damage the inflatable product material.

Typically, the same material is used for both the fabric panel 12 and the seam tape 14, as well as any accessory fabric. Therefore, coating melt temperature tolerances of these components are exactly the same. High heat tolerance is typically required from the fabric panel (used as the inflatable tube material) in order to withstand extreme heat effects that these inflatable products experience during their lifetime. For example, currently air- or gas-holding body tube materials for use in manufacturing inflatable evacuation slides and inflatable evacuation slide/rafts need to pass a high heat resistance test (also called radiant heat test as specified in TSO C69c).

However, this required high heat tolerance may have a negative effect on the welding process, as higher heat is needed to weld the seam tape to the fabric panel. High heat has the potential to damage the material itself (i.e., particularly when a more lightweight panel material is used), as well as the coatings in the seam vicinity, thereby causing seam leaks. Thus, because both the seam tape and the panel (as well as any accessory fabric) are built from the same material, there is a constant balancing act between seam adhesion strength, coating melt temperatures, and seam air- or gas-holding characteristics.

One aspect of this disclosure thus provides a seam tape with a lower melting temperature than the fabric panel.

Additionally, many of the body tube materials in use also incorporate heat reflective materials in order to reflect heat (during the radiant heat test) and to prolong the heat withstanding capability of the air- or gas-holding body tube material. The heat reflective materials added to the air- or gas-holding body tube materials for inflatable evacuation slides and inflatable evacuation slide/rafts require higher welding temperatures than materials without heat reflective coatings.

Accordingly, another aspect of this disclosure solves this issue by removing the heat reflective material from the seam tape material—allowing a high adhesion strength (especially in the crossover area/junction points) at various seam configurations on the inflatable product. Heat reflectivity can be added to the seam after it has been welded in order to satisfy the high heat resistance test requirement.

This disclosure thus relates to a dedicated seam tape or dedicated accessory fabric that a) utilizes specialized coatings with a lower melt temperature compared to coatings that are used on inflatable fabric material (b) is manufactured from material that has not been treated to have substantial reflective properties The present disclosure overcomes some of the described deficiencies experienced with manufacturing inflatable products by using a specific material for the seam tape with higher adhesion and lower melt coatings in order to join multiple panels of air- or gas-holding fabric. Rather than forming the seam tape out of the same fabric used for the air- or gas-holding tube panels (which has resulted in a seam tape that has the same properties as the body tube fabric), this disclosure uses a different material for the seam tape. The seam tape is only used to structurally join two panels;

it does not have to be air- or gas-holding and does not need to have the same properties as the body tube fabric.

In one example, for inflatable products such as evacuation slides and evacuation slide/rafts, the seam tape should have adhesion to withstand radiant heat temperatures and to still hold a seam. For inflatable applications that involve only life rafts, the seam tape is not required to withstand radiant heat temperatures. Taking this into account, the inventors have found improved coating transfer and seam adhesion at lower welding temperatures by using a fabric with properties different than the body tube fabric. This is true when both welding the seam tape to body tube material or panel and when welding the seam tape to itself. This is also true when using the material to weld one or more accessories (such as an inflation port, a sliding surface, a raft floor, a handle, a girt, a ramp, a canopy, a patch, or any other appropriate structure) to the body tube material or panel.

An additional benefit is that by using a specific chemistry, the disclosed seam tape is able to protect the body tube fabric during the welding process. This is accomplished by welding at a lower temperature.

The typical temperature to weld a seam tape to body tube fabric (when both are of the same material) using typical welding techniques is between 270-300° C. However, through the use of lower melt coatings, the disclosed seam tape is able to be welded to the body tube fabric at lower temperatures.

The welding temperatures for the disclosed seam tape (or accessory fabric) may be at least 10, 20, 30 or more degrees Celsius (° C.) lower than what is typically required to weld two panels of body tube fabric together. In a specific example, the welding temperature is at least 10 degrees lower than such a weld temperature. In other specific examples, the improved seam tape (or accessory fabric) disclosed can be welded to body tube fabric at temperatures between about 200-280° C. Specific melt temperature ranges include but are not limited to between about 200-230° C., between about 220-250° C., or between about 240-280° C. This lower melting temperature of the dedicated seam tape and accessory fabric may be achieved by using lower melt coatings. These coatings are essentially a similar chemistry to the body tube fabric, but have lower melting and softening temperatures as compared to existing coatings. The chemistry of these coatings can be tailored to allow for maximum bond strength at lowest melting temperature when welded. Non limiting exemplary coatings include but are not limited to: nylon, polyurethane, vinyl, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), polylactic acid (PLA), or any combination thereof, or any other appropriate materials.

Through the use of the lower welding temperatures, the disclosed seam tape minimizes the chance of heat related damage to the body tube fabric. Heat related damage occurs when too much heat is applied in order to weld the two panels together and the fabric itself either melts, is burned, or is otherwise damaged such that optimal use is lessened.

Second, the dedicated seam tape or accessory fabric may also be manufactured without additional heat reflective properties/materials. Exemplary materials that may be left out of the seam tape or accessory fabric include but are not limited to aluminized coatings; ceramic microspheres; coatings, flakes or metalized films of aluminum, copper, silver, multi-layer optical filters, or combinations thereof; materials such as glass microspheres, poly(vinylidene fluoride-co-hexafluoropropene); or any other material that is typically added to material manufactured in order to render the material with reflective properties. This disclosure is intended to include materials that are manufactured without any other form of heat reflective material that is typically required to be provided in body tube material for inflatable products in order to meet radiant heat temperatures. In other words, the seam tape and accessory fabrics may be manufactured from material that has not been treated to have substantial reflective properties that render the material sufficient to pass radiant heat requirements. It should be understood, however, that some material with reflective properties may be present in the seam tape or accessory fabric, but not to the extent required by current regulations in order for the fabric to be considered reflective or having reflective properties as required under the various regulations or to otherwise pass radiant heat testing requirements. This is because at the intersection where the seam tape crosses over another seam tape section, providing a seam tape without heat reflective material properties incorporated therein can result in a seam tape that has a stronger bond. This also allows for a lower welding temperature—as there is no heat reflective coating. If necessary, heat reflective materials can be added to the seam after it is welded to satisfy the high heat resistance test requirement.

Embodiments of this disclosure provide specific coating chemistries used on the seam tapes to provide very high seam strength as well as overall better seam consistency. (As used herein, the phrase "high seam strength" is intended to mean a seam peel strength of at least 5 pounds/inch, a seam shear strength of at least 175 lbs/inch at room temperature and 40 lbs/inch at an elevated temperature of about 140° F.) Some such seams must have a peel strength of 5 lbs/inch (evacuation slides, evacuation slide/rafts and life rafts) and others must have a peel strength of 10 lbs/inch (life preservers/vests). The requirements outlined herein are current requirements; it should be understood that the materials described by this disclosure may have various features modified in order to meet other requirements that may be set in the future or by different regulatory authorities.

This leads to reduced (to minimal and even preferably to no) leakage due to damaged coatings in the seam area, as well as a high crossover (junction point) seam strength, which is also critical to seam designs used on inflatable products.

Non-limiting examples of materials that may be used to form the body tube material include but are not limited to polyamide (nylon), polyurethane, vinyl, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), polylactic acid (PLA), or any combination thereof; any woven, nonwoven, knitted, or film-based substrate, any combinations thereof, or any other appropriate materials. It should be understood that the industry is exploring other materials in connection with inflatable structures, and that such materials may be used to form the structures described herein.

Non-limiting examples of fibers that may be used to form the disclosed seam tape include but are not limited to polyamide (nylon), polyethylene terephthalate (PET), polyester, ultra high molecular weight polyethylene, polypropylene, cotton, carbon, glass meta-aramid material (such as like Nomex®), para aramid (such as Kevlar®), liquid crystalline polymers, and combinations thereof. The fibers may be any woven, nonwoven, knitted, or film-based substrate, any combinations thereof, or any other appropriate materials that can form a seam tape that does not require an additional air- or gas-holding film to make an air tight joint.

Different embodiments of the disclosed seam tape could have different properties based on the application to which it is intended/targeted for use on.

The seam tape or dedicated accessory fabric may be provided in a roll form. The roll may then be cut into desired sizes in order to use the material as dedicated seam tape. Alternatively, if the material is to be used as a dedicated accessory fabric, the accessory may be formed directly out of the roll material.

Figure 7:
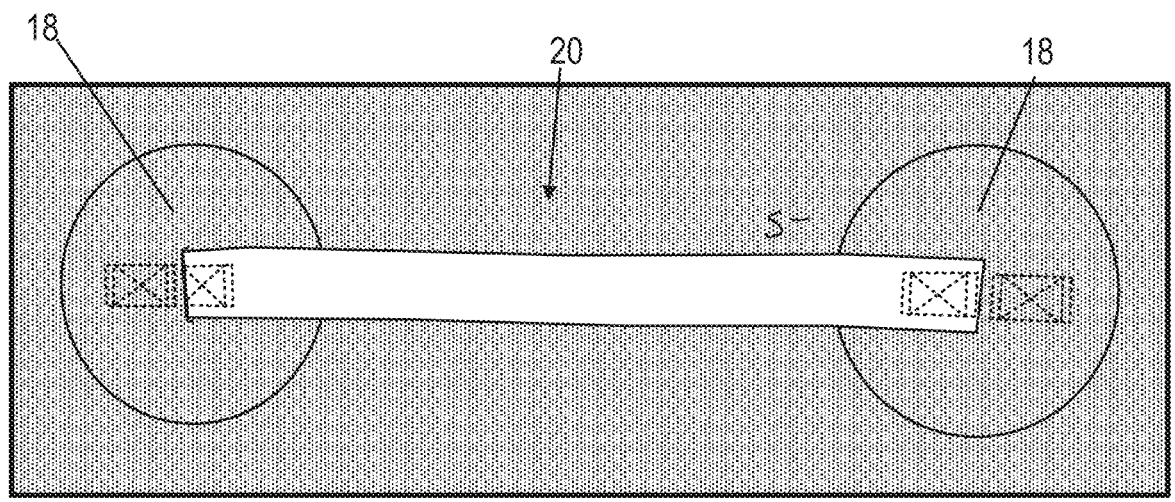
FIG. 7 illustrates accessory patches made out of the disclosed seam tape material and welded to a body tube material.
Figure 8:
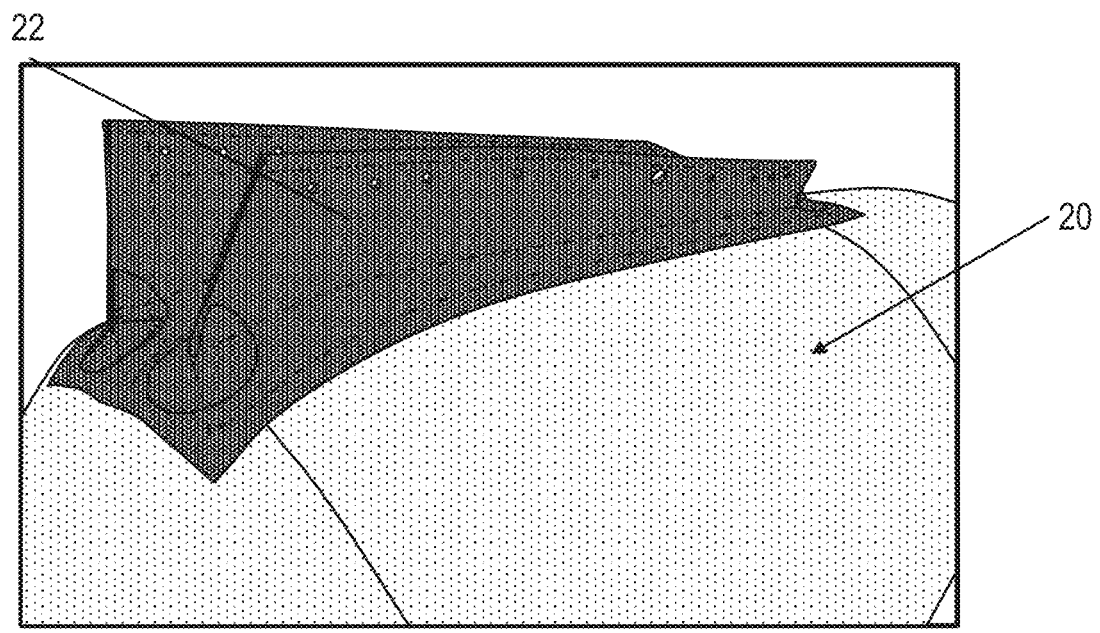
FIG. 8 illustrates a girt made out of the disclosed seam tape material and welded to a body tube material.

For example, in another embodiment, the seam tape material disclosed may be used as a fabric for accessories that are to be attached to inflatable structures. Accessories can include but are not be limited to: an inflation port, a sliding surface, a raft floor, a handle, a girt, a ramp, a canopy, a patch, or any other appropriate structure. FIG. 7 illustrates exemplary accessory patches 18 made out of seam tape material that are welded to a body tube material 20. FIG. 8 illustrates an exemplary girt 22 made out of seam tape material that is welded to a body tube material 20.

Typically, accessories are made from body tube fabric which is intended for air- or gas-holding purposes—this results in an accessory that has the same properties as the body tube fabric. However, accessories do not need to be air- or gas-holding. Accordingly, accessories may be made out of the disclosed seam tape material that may also be welded to the body tube material or panels at lower temperatures, lower heat settings, or lower energy settings and provide higher adhesion properties.

The disclosed seam tape may be made from a fabric or include coatings that create a non-porous surface. Alternatively, it may be made from a fabric or include coatings that create a porous surface.

The disclosed seam tape may have features similar to those described in co-pending application Ser. No. 16/504, 962, titled "Sealed Reinforced Tape." That disclosure is incorporated herein by reference.

Although the embodiments described herein focus on life-saving inflatable devices, such as evacuation slides, evacuation slide/rafts, emergency floats, emergency flotation systems, and life preservers, it should be understood that the disclosure is equally applicable to other fabric-like devices, including but not limited to inflatable/non-inflatable decontamination shelters, inflatable/non-inflatable shelters, inflatable/non-inflatable military shelters, ship decoys, inflatable military targets, and space inflatable applications.

It should be understood that different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. An accessory for an air-holding or gas-holding inflatable product and configured to be welded to one or more panels of the inflatable product, wherein the accessory comprises an accessory fabric comprising a substrate and a coating on the substrate, the coating having a melt temperature at least 10° C. lower than the one or more panels to which the accessory fabric is welded, and wherein the accessory is not a seam tape.

2. The accessory of claim 1, wherein the substrate of the accessory fabric comprises polyamide (nylon), polyethylene terephthalate (PET), polyester, ultra high molecular weight polyethylene, polypropylene, cotton, carbon, glass meta-aramid material, para aramid material, liquid crystalline polymers, or any combination thereof.

3. The accessory of claim 1, wherein the coating on the substrate of the accessory fabric comprises polyurethane, vinyl, polyethylene, polypropylene, polyamides, polyethylene terephthalate (PET), polystyrene, ethylene vinyl acetate (EVOH), polyvinylidene chloride (PVDC), polyvinyl alcohol (PVOH), polycarbonate (PC), polyvinyl chloride (PVC), polylactic acid (PLA), a polymer, or any combination thereof.

4. The accessory of claim 1, wherein the inflatable product comprises evacuation slides, evacuation slides/rafts, aviation life rafts, marine life rafts, emergency floats, emergency flotation systems, life preservers/vests, emergency flotation devices, inflatable shelters (military and nonmilitary), ship decoys and inflatable military targets, flotation devices, rescue equipment, or other safety devices requiring rapid inflation and secure air or gas-holding functions.

5. The accessory of claim 1, wherein the accessory comprises an inflation port, a sliding surface, a raft floor, a handle, a girt, a ramp, a canopy, a patch, or any other combination thereof.

6. The accessory of claim 1, wherein the accessory fabric comprises a seam adhesion strength of at least about 5 pounds/inch in a peel direction.

7. The accessory of claim 1, wherein the substrate of the accessory fabric is formed from a material that has not been treated to have reflective properties.

8. A structural seam tape comprising a tensile strength of greater than 175 lbs/in and configured to independently and indirectly couple air-holding or gas-holding panels to create an air-holding or gas-holding inflatable product, each air-holding or gas-holding panel comprising a first substrate and a first coating on the first substrate, the structural seam tape comprising:

a second substrate and a second coating on the second substrate, the second coating having a melt temperature that is at least 10° C. lower than the first coating of the indirectly coupled air-holding or gas-holding panels to which the seam tape is being welded.

9. The accessory of claim 1, wherein the melt temperature of the coating is from about 200-280° C.

10. The seam tape of claim 8, wherein the seam tape comprises a seam shear strength of at least about 175 pounds/inch at room temperature.

11. The seam tape of claim 8, wherein the second substrate of the seam tape comprises polyamide (nylon), polyethylene terephthalate (PET), polyester, ultra high molecular weight polyethylene, polypropylene, cotton, carbon, glass meta-aramid material, para aramid material, liquid crystalline polymers, or any combination thereof.

12. The seam tape of claim 8, wherein the second coating of the seam tape further comprises polyurethane, vinyl, polyethylene, polypropylene, polyamides, polyethylene terephthalate (PET), polystyrene, ethylene vinyl acetate (EVOH), polyvinylidene chloride (PVDC), polyvinyl alcohol (PVOH), polycarbonate (PC), polyvinyl chloride (PVC), polylactic acid (PLA), a polymer, or any combination thereof.

13. The seam tape of claim 8, wherein the inflatable product comprises evacuation slides, evacuation slides/rafts, aviation life rafts, marine life rafts, emergency floats, emergency flotation systems, life preservers/vests, emergency flotation devices, inflatable shelters (military and nonmilitary), ship decoys and inflatable military targets, flotation devices, rescue equipment, or other safety devices requiring rapid inflation and secure air or gas-holding functions.

14. The seam tape of claim 8, wherein the seam tape comprises a seam adhesion strength of at least about 5 pounds/inch in a peel direction.

15. The seam tape of claim 8, wherein the second substrate of the seam tape is formed from a material that has not been treated to have reflective properties.

16. The accessory of claim 1, wherein the seam tape has a seam shear strength of at least about 175 pounds/inch at room temperature.

17. An inflatable product comprising:
   at least two air-holding or gas-holding fabric panels, each air-holding or gas-holding fabric panel comprising a first substrate and a first coating on the first substrate; and
   a structural seam tape with a tensile strength of greater than 175 lbs/in and welded to each of the at least two air-holding or gas-holding fabric panels,
   wherein the at least two air-holding or gas-holding fabric panels are indirectly coupled to each other using the structural seam tape,
   wherein the seam tape comprises a second substrate and a second coating on the substrate, the second coating having a melt temperature at least 10° C. lower than the first coating of the at least two air-holding or gas-holding fabric panels to which the seam tape is welded, and
   wherein the inflatable product is an air-holding or gas-holding inflatable product.

18. The inflatable product of claim 17, wherein the inflatable product comprises at least one of: an evacuation slide, an evacuation slide/raft, an aviation life raft, a marine life raft, an emergency float, an emergency flotation system, a life preserver/vest, an emergency flotation device, an inflatable shelters, a ship decoy, an inflatable military target, a flotation device, or rescue equipment.

19. The inflatable product of claim 17, wherein the seam tape covers a gap defined between edges of the at least two fabric panels.

\* \* \* \* \*